US010831083B1

(12) United States Patent
Rejniak et al.

(10) Patent No.: US 10,831,083 B1
(45) Date of Patent: Nov. 10, 2020

(54) UNDERWATER LIGHT AND CAMERA SYSTEM

(71) Applicants: Brian Rosser Rejniak, Yorba Linda, CA (US); John Alan Rejniak, Yorba Linda, CA (US)

(72) Inventors: Brian Rosser Rejniak, Yorba Linda, CA (US); John Alan Rejniak, Yorba Linda, CA (US)

( * ) Notice: Subject to any disclaimer, the term of this patent is extended or adjusted under 35 U.S.C. 154(b) by 0 days.

(21) Appl. No.: 16/879,620

(22) Filed: May 20, 2020

(51) Int. Cl.
*G03B 17/08* (2006.01)
*E04H 4/14* (2006.01)
*G03B 29/00* (2006.01)
*F21S 8/02* (2006.01)
*F21W 131/401* (2006.01)

(52) U.S. Cl.
CPC ............. *G03B 17/08* (2013.01); *E04H 4/148* (2013.01); *F21S 8/024* (2013.01); *G03B 29/00* (2013.01); *F21W 2131/401* (2013.01)

(58) Field of Classification Search
USPC ...................................................... 396/25, 28
See application file for complete search history.

(56) References Cited

U.S. PATENT DOCUMENTS

| | | | | |
|---|---|---|---|---|
| 6,133,838 A * | 10/2000 | Meniere | ................ | G08B 21/082 340/566 |
| 6,262,761 B1 * | 7/2001 | Zernov | ................... | G03B 15/03 348/61 |
| 6,642,847 B1 * | 11/2003 | Sison | .................... | G08B 21/082 340/565 |
| 8,172,434 B1 * | 5/2012 | Olsson | .................... | B63B 45/00 362/346 |
| 10,394,106 B1 * | 8/2019 | Olsson | .................... | G03B 17/08 |
| 2006/0177206 A1 * | 8/2006 | Takanashi | .............. | G03B 17/08 396/27 |
| 2007/0242134 A1 * | 10/2007 | Zernov | .................. | B63G 8/001 348/81 |
| 2008/0106422 A1 * | 5/2008 | Sparks | ...................... | E04H 4/14 340/573.6 |
| 2009/0027497 A1 * | 1/2009 | Peacock | ............... | H04N 5/2254 348/143 |
| 2011/0012356 A1 * | 1/2011 | Burnham | ................. | F21S 9/046 290/52 |
| 2014/0301727 A1 * | 10/2014 | Resh | ....................... | G03B 17/08 396/28 |
| 2015/0138336 A1 * | 5/2015 | Ueno | ..................... | G03B 35/08 348/81 |
| 2017/0059805 A1 * | 3/2017 | Ranetkins | .............. | G03B 17/14 |

(Continued)

FOREIGN PATENT DOCUMENTS

DE         102013101692 A1 *   8/2014   ............... E04H 4/06

*Primary Examiner* — Rodney E Fuller
(74) *Attorney, Agent, or Firm* — Cionca IP Law P.C.; Marin Cionca

(57) ABSTRACT

An underwater light and camera system having a video camera with a camera lens, a pool light with a light source and a pool light lens, and an anti-reflective shield surrounding a clear portion of the pool light lens. The pool light lens has the clear portion and a plurality of ribs disposed on an outer surface of the pool light lens, other than on the clear portion of the pool light lens. The anti-reflective shield is darkened to prevent light from the light source and light reflecting off a portion of the pool light lens disposed outside the anti-reflective shield to directly reach the camera lens.

17 Claims, 14 Drawing Sheets

(56) References Cited

U.S. PATENT DOCUMENTS

2018/0087741 A1* 3/2018 McFadyen ............ F21V 17/164
2019/0212549 A1* 7/2019 Choi ...................... G02B 21/36
2020/0023238 A1* 1/2020 Firmin .................... G09B 5/00

* cited by examiner

UNDERWATER LIGHT AND CAMERA SYSTEM

BACKGROUND OF INVENTION

1. Field of the Invention

The invention relates generally to camera and light devices, and more specifically to underwater camera and light devices.

2. Description of the Related Art

Currently, portable underwater camera devices are the primary method for capturing underwater video and photo footage. However, portable underwater camera devices are at a disadvantage because they need to be operated by a person and thus do not capture the entire pool view. These devices also require batteries or to be charged for use and they do not provide a continuous feed. Furthermore, if a person desired having a more permanent underwater recording device, they would need to install a designated camera for surveillance, which requires an additional niche, conduits and wiring and would also have a long construction time. All of these are additional installation parts and labor making the construction expensive.

Additionally, permanent underwater camera devices typically have poor image quality because of the pool light interference. It is common for the pool lights to be reflected into the camera lens making the footage poor quality or not visible at all. Therefore, there is a need to solve the problems described above by proving a stationary device for capturing underwater video and photo footage.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, an underwater light and camera system having a pool light with a light source and a pool light lens, wherein the pool light lens has a clear portion and a plurality of ribs disposed on an outer surface of the pool light lens. The ribs would be disposed on the outer surface of the pool light lens other than where the clear portion is. The underwater light and camera system also having a video camera with a camera lens, wherein the camera lens is flush with the pool light lens. The underwater light and camera system having an anti-reflective shield surrounding the clear portion of the pool light lens, wherein the anti-reflective shield is darkened to prevent light from the light source and a portion of the pool light lens disposed outside the anti-reflective shield to directly reach the camera lens. Thus, an advantage is capturing pool footage without light interference on the image quality.

In another aspect, an underwater light and camera system being installed into an existing pool niche. The underwater light and camera system would not require further construction on a person's pool. Thus, an advantage is cost reduction because construction to create a pool niche in a user's pool is not necessary.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which.

DETAILED DESCRIPTION

Figure 1:
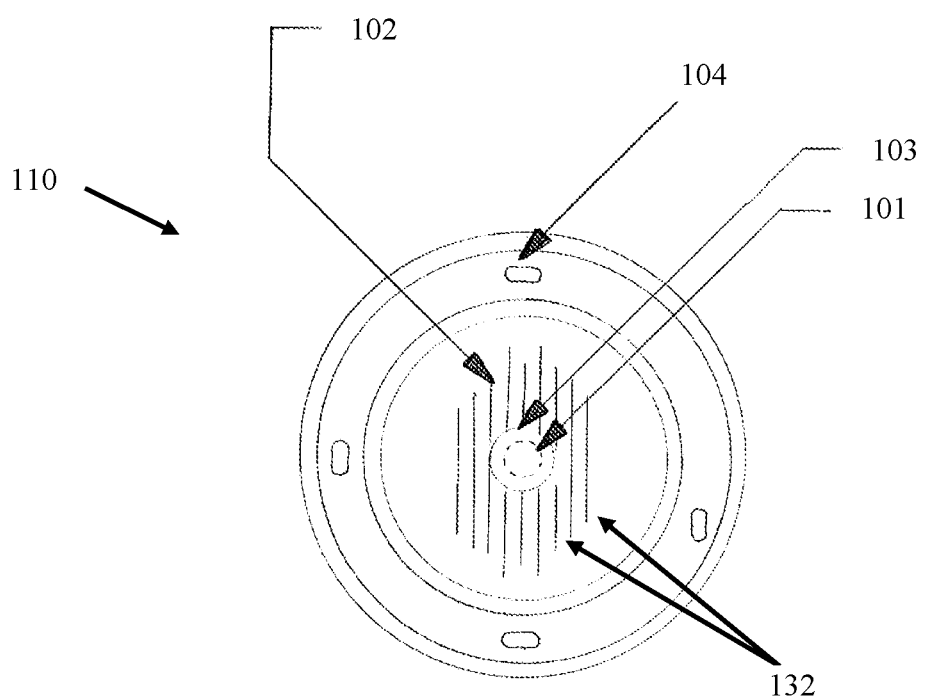
FIG. 1 illustrates the front view of a pool light and camera assembly, according to an aspect.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

It should be understood that, for clarity of the drawings and of the specification, some or all details about some structural components or steps that are known in the art are not shown or described if they are not necessary for the invention to be understood by one of ordinary skills in the art.

As used herein and throughout this disclosure, the term "mobile device" refers to any electronic device capable of communicating across a mobile network. A mobile device may have a processor, a memory, a transceiver, an input, and an output. Examples of such devices include cellular telephones, personal digital assistants (PDAs), portable computers, etc. The memory stores applications, software, or logic. Examples of processors are computer processors (processing units), microprocessors, digital signal processors, controllers and microcontrollers, etc. Examples of device memories that may comprise logic include RAM (random access memory), flash memories, ROMS (read-only memories), EPROMS (erasable programmable read-only memories), and EEPROMS (electrically erasable programmable read-only memories). A transceiver includes but is not limited to cellular, GPRS, Bluetooth, and Wi-Fi transceivers.

Mobile devices communicate with each other and with other elements via a network, for instance, a cellular network. A "network" can include broadband wide-area networks, local-area networks, and personal area networks. Communication across a network can be packet-based or use radio and frequency/amplitude modulations using appropriate analog-digital-analog converters and other elements. Examples of radio networks include GSM, CDMA, Wi-Fi and BLUETOOTH® networks, with communication being enabled by transceivers. A network typically includes a plurality of elements such as servers that host logic for performing tasks on the network. Servers may be placed at several logical points on the network. Servers may further be in communication with databases and can enable communication devices to access the contents of a database. For instance, an authentication server hosts or is in communication with a database having authentication information for users of a mobile network For the following description, it can be assumed that most correspondingly labeled elements across the figures (e.g., 102 and 202, etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

FIG. 1 illustrates the front view of a pool light and camera assembly 110, according to an aspect. Throughout the following text the description "pool," for all intents and purposes, is also known as "swimming pool." The pool light and camera assembly 110 is shown having a camera 101, a lens 102, and a typical LED pool light assembly 104. Typically, pool light lenses have ribs 132, which help distribute the light throughout the large body of water. As shown the pool light and camera assembly 110 has a clear portion 103 on the lens 102, which allows the camera 101 to have a clear view of the interior of the pool. Furthermore, the lens 102 may still have ribs 132 to help distribute light, but also has the clear portion 103 to provide a better view for the camera 101. The camera 101 may be mounted into any portion of the existing pool light structure such as the center, top, bottom or side. As shown in FIG. 1, the camera 101 is mounted in the center of the lens 102, with the lens' clear portion 103 also in the center. The LED (Light Emitting Diodes) lights may be arranged to allow for the camera to be mounted, thus the camera may be located with consideration of the LED light's array. Furthermore, the lens 102 has an anti-reflective shield, which will be described in more detail when referring to FIG. 7.

An underwater light and camera system having a camera 101, a pool light, and a lens 102 with a clear portion 103 is described herein. The underwater light and camera system also having a processor, a wireless communications module, transmitter, or transceiver, which is described in more detail when referring to FIG. 3. The transceiver may receive the outbound video data signals from the image data of the camera 101. The system then, may send a processor to be converted to digital compressed video data to transmit to a server via a wireless communications module. Additionally, the transmitter or transceiver may have an active mode, which may be controlled by settings. For example, the transmitter or transceiver may be activated through a power processor, switch, relay, power on, motion sensor or other means to power the device associated to user, which will be described in more detail when referring to FIG. 6.

The underwater light and camera system may further have a computer implemented method for a wireless video feed. In an example, the underwater light and camera system may also have a plurality of motion sensors, an internet application ("app"), URL, web browser, a designated website, a downloadable phone application installed on a smart device, web-based application on a computer, or a phone or tablet device with a display or monitor. For example, the underwater light and camera system may detect that a motion is present when the motion sensors are installed, which would allow for capturing an image of the objects, animals or person in response to detecting motion presence. The system may then transmit the captured images and video data feed to a transmitter or control panel for delivery of the captured image to the web app or URL and ultimately a remote computing device, phone or tablet, which will be discussed in more detail in FIG. 6.

Figure 2:
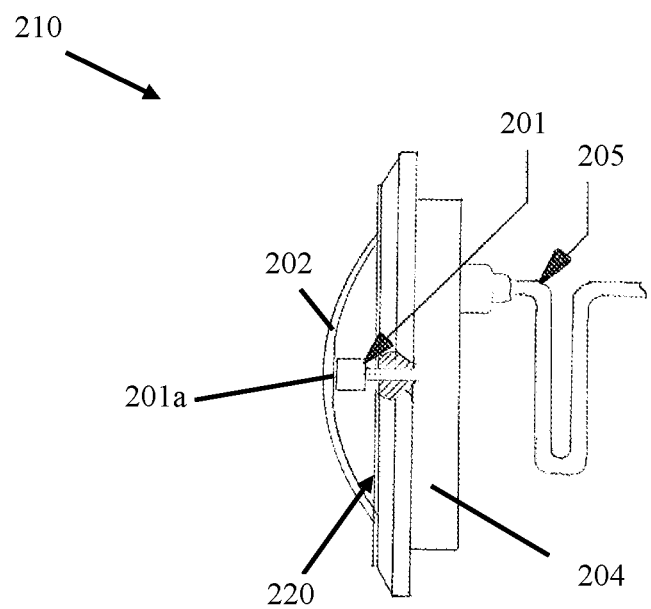
FIG. 2 illustrates the side view of a pool light and camera assembly, according to an aspect.

FIG. 2 illustrates the side view of a pool light and camera assembly 210, according to an aspect. As shown, the camera face 201a may be flush with the pool light lens 202 to minimize the possibility of light reflecting off of the pool light lens into the camera lens, whenever the lights ("LEDs", "LED lights", "light source") 220 are illuminating the pool. As described herein, the lens 202 may be a clear cover for a light source 220 to provide a means to focus the light beams and contains a clear portion for optimum video camera and pool light operation.

Furthermore, FIG. 2 demonstrates how an underwater camera may fit into an existing pool light fixture. The pool light lens ("clear cover", "lens", "light lens cover", "cover") 202 of the pool light fixture may also provide a waterproof niche 204. An anti-reflective shield may be molded into the pool light lens 202 to prevent any reflection of the light into the camera from the lines, which will be discussed in more detail in FIG. 6. Typically, a pool light fixture has an underwater low-voltage LED pool light which may accommodate the addition of a video camera 201 mounted into the watertight compartment of the light fixture. In an example, an underwater high definition wide angle video camera may be used.

Additionally, the light sources 220, such as LED lights, are usually powered by a 12 Volt source, which may be recommended over a typical 120 Volt AC source because the higher AC voltage may most likely interfere with the camera's single circuit. The interference of an electromagnetic field's electronic noise (unwanted disturbance) is caused by the higher AC voltage. Since the light sources 220 are usually powered by a 12 V source, a cable 205 may be implemented to connect the pool light 220 and video device 201 to the power source. For example, a multi-conductor low-voltage type of wire may be used for the light source 220 power supply with separate circuits for the camera and a grounding conductor for any metallic parts may be necessary.

Figure 3:
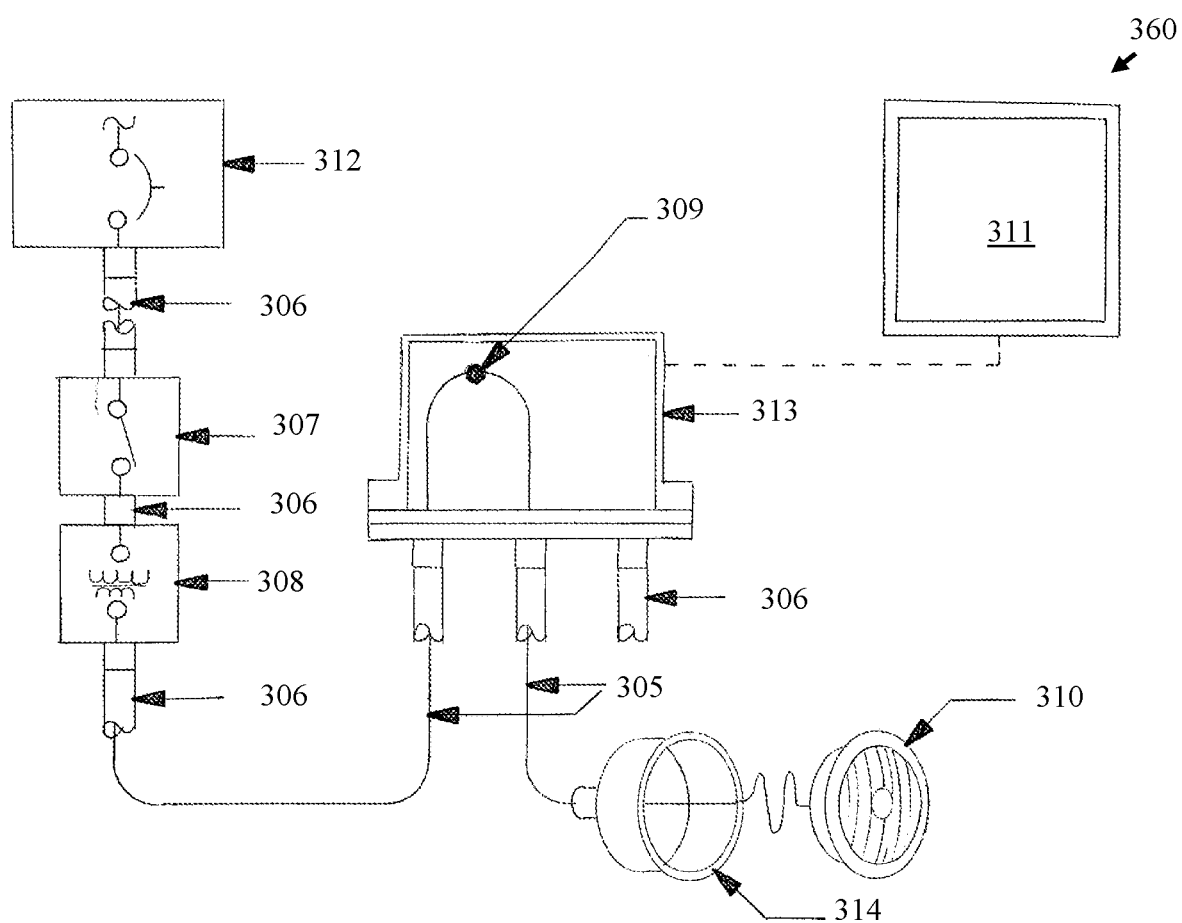
FIG. 3 illustrates the exploded view of the underwater light and camera system, according to an aspect.

FIG. 3 illustrates the exploded view of the underwater light and camera system 360, according to an aspect. For example, as shown, the primary 120 VAC power remains as the current pool light circuit, which may be fed by and protected by a GFCI (Ground Fault Circuit Interrupter) 312. It should be noted that a circuit breaker symbol, as shown in FIG. 3. For example, the circuit breaker in the power supply load center may be an actual GFCI type circuit breaker or a standard circuit breaker, which are usually rated at 15 A.

For example, if a standard circuit breaker is used a GFCI 312 receptacle may be added in series with the pool light and video camera assembly 310 dedicated circuit. A dedicated circuit means it powers no other pool equipment with the exception of the GFCI acting as a convenience receptacle located at the pool equipment load center. A conduit 306, as shown, may be required to house the wires and cables in and approved to safe manner between enclosures to meet the National and Local Electrical Code and UL's approved and listed regulations.

In another example, the power supply 312, timer or switch 307, and the transformer 308 as shown in FIG. 3 may be one or more enclosures to house the components of the power source wiring of the system. The multi-conductor cable 305, which may have multiple conductors' wires, and for example, in a manufactured cable is voltage rated and waterproof, may be used to connect 309 the electronics of the system. In this example, it may contain the light's power supply, which shares the video camera circuit with a video out circuit. The video out circuit discussed in more detail in reference to FIG. 5.

Furthermore, as an example, a 12 VAC power supply may be fed from the transformer 308 to the primary 120 V AC pool light circuit, which are sized to meet the capacity in total Watts of the pool light circuit. With a separate 12 V DC regulated power supply, a small video camera may have a wattage of 500 mA at 12 V DC and with that rating the video camera circuit may have minimal drain on the total Watts of the pool light circuit. The 12-volt DC power supply will be discussed in more detail in reference to FIG. 5.

Typically, the pool light junction box 313 is an existing junction box for the purpose of splicing pool light wiring from the power source 312 to the pool light cables. The retrofit kit 311 may be provided with the underwater light and camera system, which may supply users with the items necessary to adapt their pool niche 314 to support the underwater light and camera system. For example, the components may include an additional junction box or approved electrical and enclosures to house a wireless transmitter with or without an antenna dependent on the transmitter model used. In addition, the retrofit kit 311 may contain a ⅞-inch hole saw to accept the ½-foot electrical trade size conduit and cord connector fittings and for installation of a weatherproof cord or flexible weatherproof conduit connector and fitting. Furthermore, the wireless transmitter may be available in this retrofit kit 313.

In an example, the connections 309 may be approved splices and terminal blocks as commonly used by qualified persons. Furthermore, the pool light and video camera assembly 310 as shown may be typically installed into swimming pool by qualified persons in an existing pool niche 314.

Figure 4:
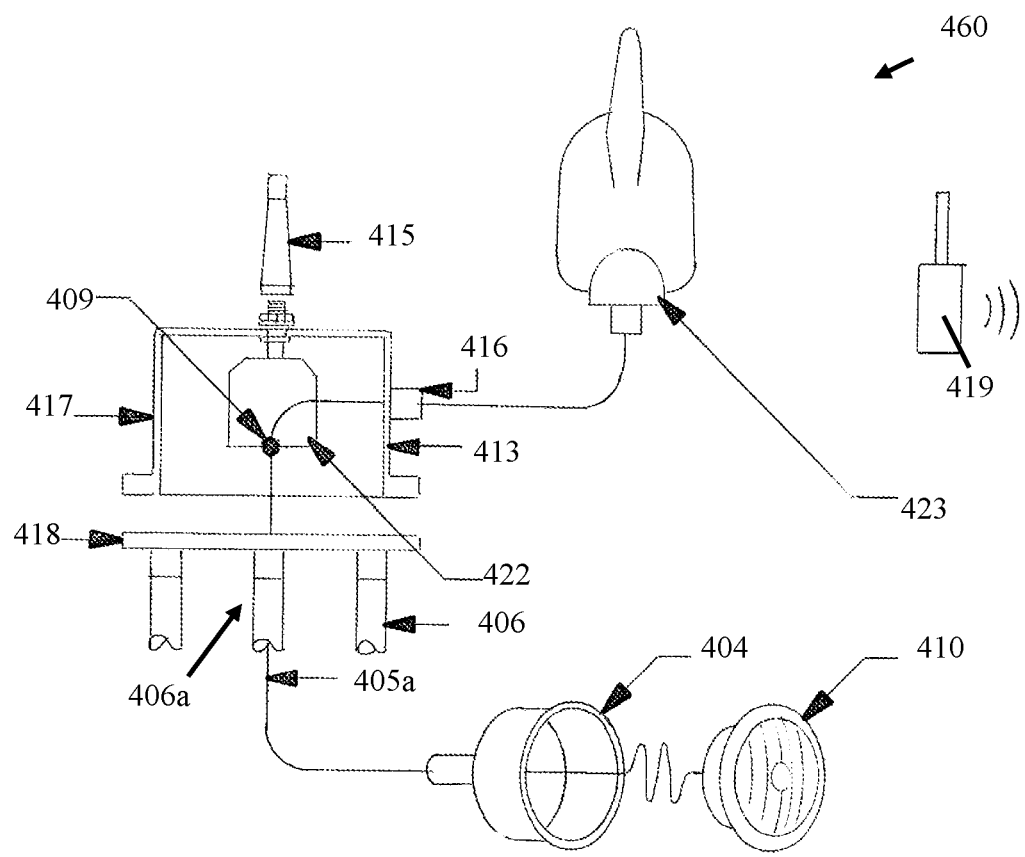
FIG. 4 illustrates the perspective view of the underwater light and camera system, according to an aspect.

FIG. 4 illustrates the perspective view of the underwater light and camera system 460, according to an aspect. As shown in FIG. 4, the illustration demonstrates an example of a typical video camera signal wiring from the video camera 401 to the transmitter module 423. Also shown in FIG. 4 is the wireless transmitter (junction) box 422, which may be mounted. The wireless transmitter box 422 receives a video signal from the video camera 401 and converts the original signal to a wireless transmission to the WIFI unit, or home transceiver 419. An exterior antenna 415 is shown, which may be used in conjunction with the wireless transmitter module assembly, but some wireless transmitter module assemblies may have an internally mounted antenna.

Moreover, the remote (wireless) transmitter 423 may be wall mounted. Typically, in swimming pool automated equipment, a remote wireless transceiver 423 shown in FIG. 4, is often used in the wall-mounted configuration. Commonly, the WIFI unit 419 is used in user's residences and may act as a wireless receiver in this application. The pool light junction box 413 may serve as a means for splicing swimming pool light cable 405 and primary system to power the pool light and camera assembly 410. Additionally, a remote wall-mounted or wireless transmitter 422, 423 may require wall mounting adjacent to existing pool equipment for an improved wireless signal to the home WIFI transceiver.

For example, the junction box cover 417 may be a weatherproof material to enclose splices, terminal blocks or other types of adapter fittings with weatherproof connectors 416. The junction box base 418 may be made of brass or non-metallic material in PVC. The junction box base 418 may be permanently mounted and sustained into place by the conduit 406 stubbed up from underground sources. For example, the conduit 406 may be used for routing wires and cables. As shown in FIG. 4, the middle position conduit 406*a* is continuous from the junction box base 418 to the niche 404.

The video cable 405*a* may be a video signal cable, which is part of the multiconductor cable and is connected 409 from the pool light junction box 413 to the pool LED light assembly 410 housed within the niche 404. The video cable 405*a* terminates inside the pool light assembly 410 into the video camera. The other end of the video signal cable terminates at the wireless transmitter 422, or the remote wall mount a transmitter 423, which may be spliced inside the pool light junction box 413. It should be noted the connection symbol may be a termination at the box mounted transceiver or a splice, or other approved type of connections, between the multiconductor cable and the remote transceiver cable.

Figure 5:
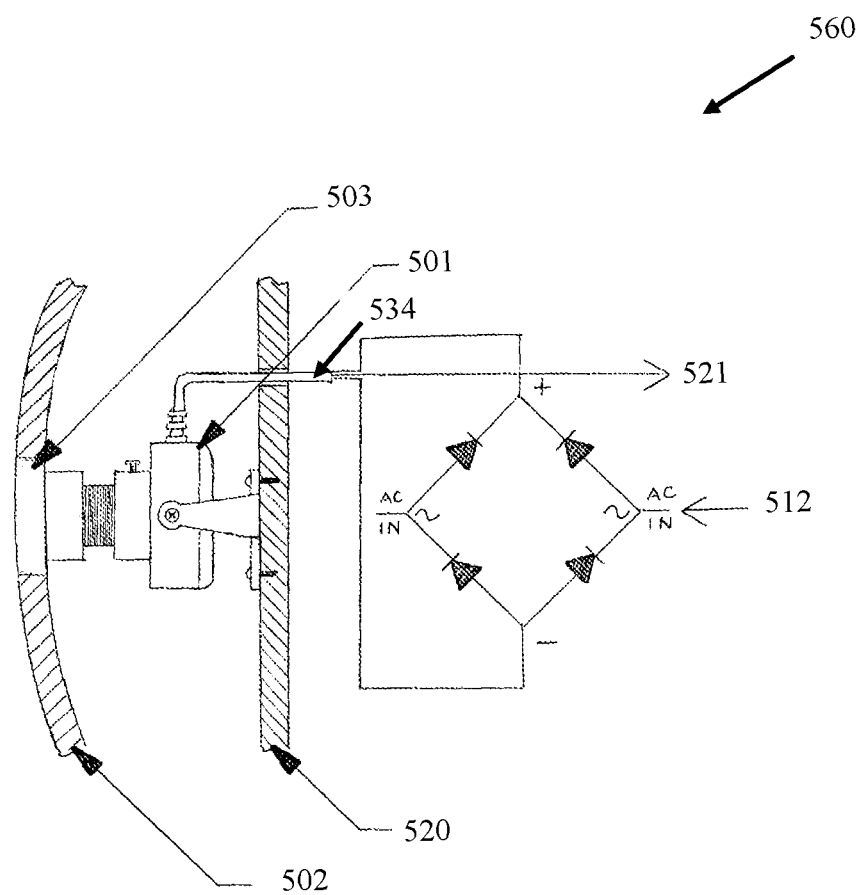
FIG. 5 illustrates the side view of the underwater light and camera system, according to an aspect.

FIG. 5 illustrates the side view of the underwater light and camera system 560, according to an aspect. As shown, there is a multi-wire cord 534, power supply 512, and video out signal 521 connected to the camera 501, which is flush against the clear portion 503 of the pool light lens 502. The light source 520 may be a part of the original low-voltage light assembly as shown in FIG. 1 and FIG. 2.

As shown in FIG. 5, the mounting of the video camera 501 is shown as an example. The video camera 501 may be mounted anywhere within the niche as long as the clear portion of the pool light lens corresponds to the location of the camera lens. For example, a video camera 501 may be pre-focused, with the focus of the video camera 501 being set at the factory. The video out 521 is the video signal that travels through the video cable to the transmitter. The video cable 521 may also be spliced in using an approved connection means, including other approved types of connections. The low-voltage light assembly during the manufacturing process may be routed into the single multiconductor cable, which may be routed into the pool light junction box as shown in FIG. 4.

For example, an unregulated full wave power supply (less capacitors and resistors) 512 symbol is used as a simplified example. However, as another example, a regulated power supply may be necessary if the video camera requires a DC voltage, as opposed to AC low voltage, as some video cameras operate on. In another more specific example, the video camera 501 may have an 8 to 12 Volt DC power requirement, which may require a separate power supply.

Figure 6A:
FIG. 6A and FIG. 6B illustrate the perspective view of the pool interior and the pool interior image captured on a computer, respectively, according to an aspect.
Figure 6B:
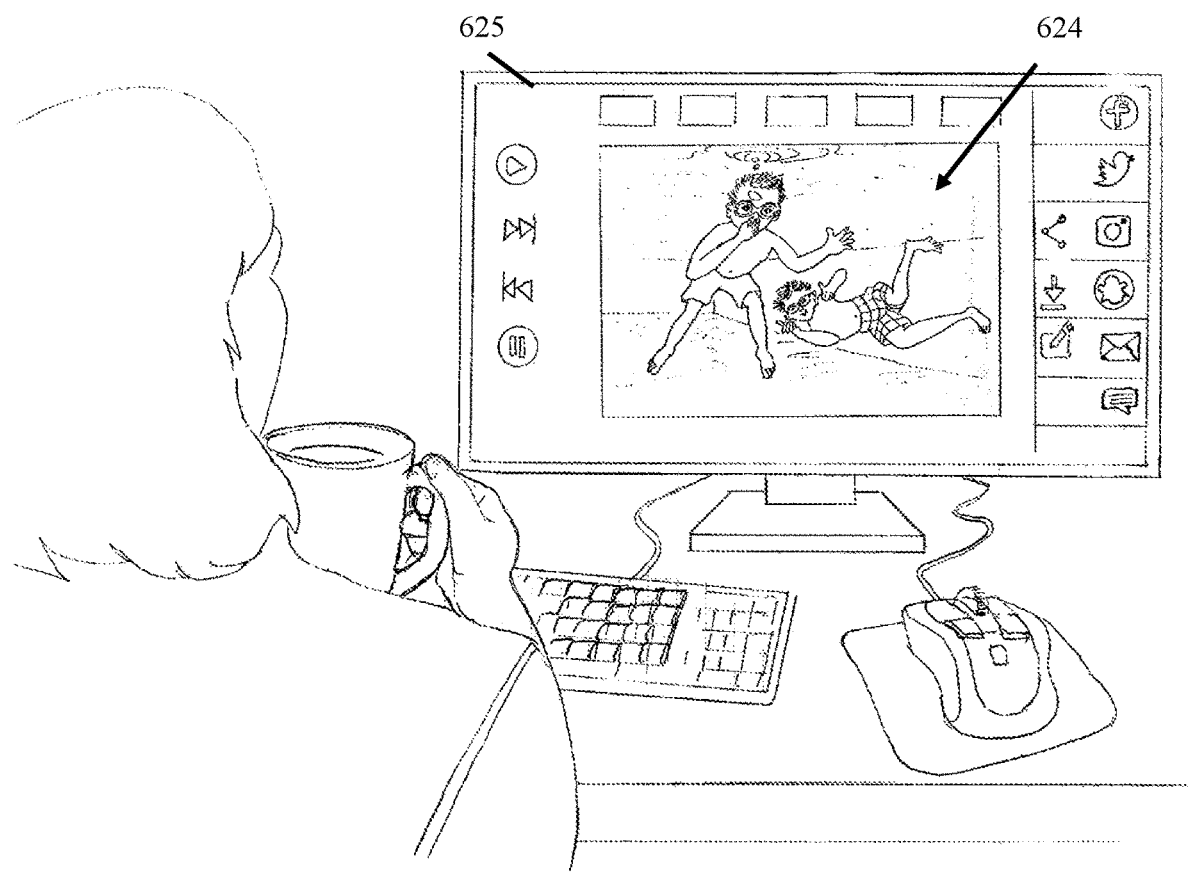

FIG. 6A and FIG. 6B illustrate the perspective view of the pool interior 624 and the pool interior image captured on a computer 625, respectively, according to an aspect. As shown, the camera captures the pool interior 624 and the system transmits the image to a selected device, such as a personal computer 625. The underwater light and camera system, for example, may have a standalone transmitter connected to WIFI and may be accessed remotely. The underwater light and camera system, for example, may also be synced to include a control panel configured to communicate with at least one mobile wireless device, tablet, network, smart device or computer 625 through an internet WIFI protocol, which may include sending image or video data to a phone URL or web application app to be retrieved in either real time or at a later date. Furthermore, the app may allow the captured footage to be viewable, edited, and shared from at least one mobile device, tablet, or computer using typical electronic messaging protocols.

The system also may include at least one automation component wirelessly connected to the control panel through a short-range WIFI wireless communication protocol. The transmitter or transceiver may also contain a microcontroller, which is a small computer on a single integrated circuit with a processor core memory and programmable peripherals. The microcontroller may have processes that are included or coupled to assist the compression and conversion of a video data for a transmission. The microcontroller may also be coupled with flash memory and RAM to install and execute software in software updates. For example, a communications module transmitter or transceiver may be coupled to the microcontroller allowing data from microcontroller to be transmitted wirelessly. Furthermore, the video and images may be processed and converted to digital data through CCD (Charge Couple Device)/CMOS (Complementary Metal Oxide Semiconductor) to be sent to processor network and communications module. The system also may include an automation component, which may have a power processor, toggle switch, relay, or sensor configured to detect power or motion, for turning the system on.

In an example, the downloadable phone application, web application, or URL may require an initial visit to a designated URL website or app to perform an initial set up, which may include setting an account, connecting to the network, connecting devices to the wireless communication network, configure home network, connect device transmitter or transceiver to home network, enter user's network credentials for one or multiple users to login. The users may have access to view, play back, download, and share their footage (videos, photos, still images) to social media, or via email, text messages, and third-party devices to make hard copy print images.

For example, the camera and light assembly may turn on depending on a sequence of cycling power to the device (often done through automation), which may cycle the power one through 21 times depending on which option the user chooses. As an example, a color changing light, such as the Hayward color logic LED, when turned on once may default to the light performance:

1 voodoo lounge

Cycling the light on then off twice will default to light show #2 Deep Blue Sea.

Cycling the light on then off 3 times will default to light show #3 Royal Blue

Cycling the light on then off 4 times will default to light show #4 Afternoon Skies Cycling the light on then off 5 times will default to light show #5 Aqua Green Cycling the light on then off 6 times will default to light show #6 Emerald Cycling the light on then off 7 times will default to light show #7 Cloud White Cycling the light on then off 8 times will default to light show #8 Warm Red Cycling the light on then off 9 times will default to light show #9 Flamingo Cycling the light on then off 10 times will default to light show #10 Vivid Violet Cycling the light on then off 11 times will default to light show #11 Sangria Cycling the light on then off 12 times will default to light show #12 Twilight Cycling the light on then off 13 times will default to light show #13 Tranquility Cycling the light on then off 14 times will default to light show #14 Gemstone Cycling the light on then off 15 times will default to light show #15 USA Cycling the light on then off 16 times will default to light show #16 Mardi Gras Cycling the light on then off 17 times will default to light show #17 Cool Cabaret Cycling the light on then off 18 times will default to light show #18 Rainbow Cycling the light on then off 19 times will default to light show #19 Harmony Cycling the light on then off 20 times will default to light show #20 Custom Fade Cycling the light on then off 21 times will default to light show #21 Custom Chase In another example, the pool light and camera assembly may have a sequence as follows when installed with as the Hayward color logic LED color changing light as an example. The camera may turn on anytime the light is on. As an example, turning the light on once may default to:

1 camera only:

Cycling the light on then off twice will default to light show #2 Voodoo Lounge AND camera Cycling the light on then off 3 times will default to light show #3 Deep Blue Sea AND camera.

Figure 7A:
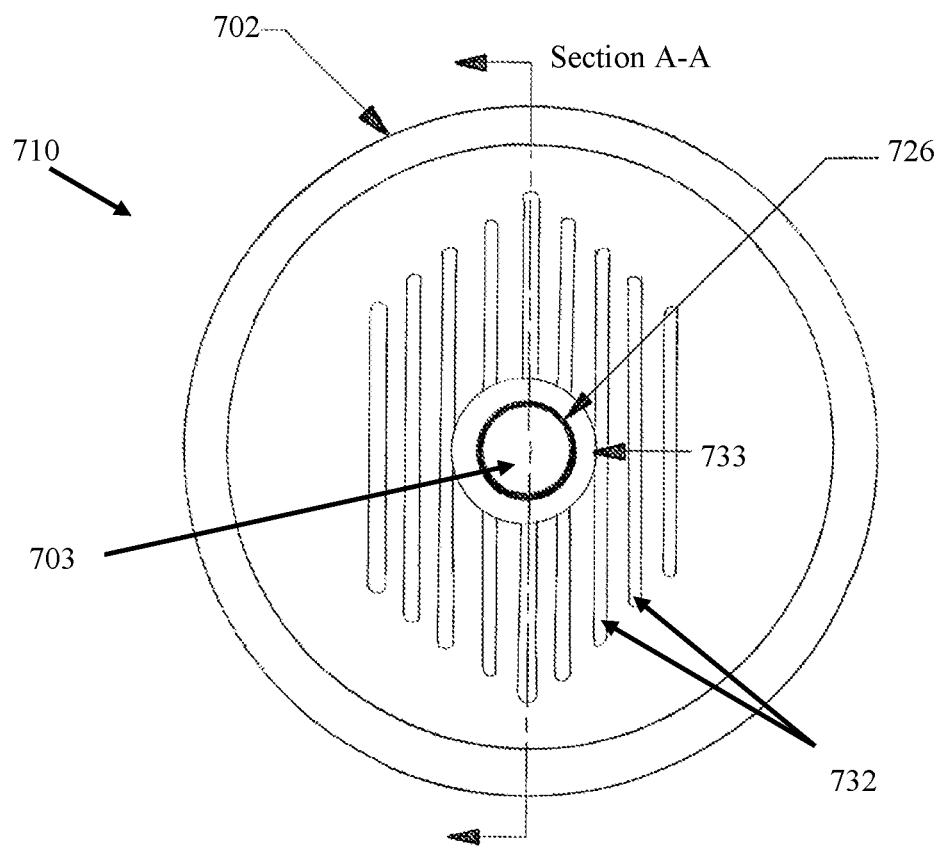
FIG. 7A and FIG. 7B illustrate the front view and sectional view A-A of a pool light and camera assembly, respectively, according to an aspect.
Figure 7B:
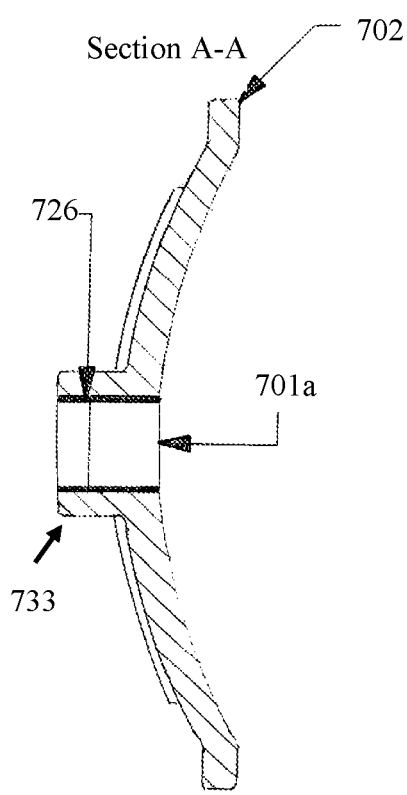

Cycling the light on then off 4 times will default to light show #4 Royal Blue AND camera Cycling the light on then off 5 times will default to light show #5 Afternoon Skies AND camera Cycling the light on then off 6 times will default to light show #6 Aqua Green AND camera Cycling the light on then off 7 times will default to light show #7 Emerald AND camera Cycling the light on then off 8 times will default to light show #8 Cloud White AND camera Cycling the light on then off 9 times will default to light show #9 Warm Red AND camera Cycling the light on then off 10 times will default to light show #10 Flamingo AND camera Cycling the light on then off 11 times will default to light show #11 Vivid Violet AND camera Cycling the light on then off 12 times will default to light show #12 Sangria AND camera Cycling the light on then off 13 times will default to light show #13 Twilight AND camera Cycling the light on then off 14 times will default to light show #14 Tranquility AND camera Cycling the light on then off 15 times will default to light show #15 Gemstone AND camera Cycling the light on then off 16 times will default to light show #16 USA AND camera Cycling the light on then off 17 times will default to light show #17 Mardi Gras AND camera Cycling the light on then off 18 times will default to light show #18 Cool Cabaret AND camera Cycling the light on then off 19 times will default to light show #19 Rainbow AND camera Cycling the light on then off 20 times will default to light show #20 Harmony AND camera Cycling the light on then off 21 times will default to light show #21 Custom Fade AND camera Cycling the light on then off 22 times will default to light show #22 Custom Chase AND camera FIG. 7A and FIG. 7B illustrate the front view and sectional view A-A of a pool light and camera assembly 710, respectively, according to an aspect. Typically, a pool light lens, also referred to as a light cover, 702 has ribs 732 which serve as magnifiers manufactured into the lens. The ribs 732 are shown disposed on an outer surface of the pool light lens. A clear area 703 in the lens allows the video camera to have an undistorted view of the underwater pool area, while the ribs 732 distribute the light around the pool light lens 702. An anti-reflective shield 726 may be molded into the pool light lens 702 to prevent any reflection of light from the light source into the camera lens from the pool light lens 702. The anti-reflective shield 726 may be fitted around the video camera, flush with the pool light lens 702, to provide an anti-reflective shield between a portion of the pool light lens disposed outside the anti-reflective shield 726, which may also reflect light directly into the camera lens 702. In an example, the lens 702 may not be a single flat surface, the lens may have a protrusion 733, which may further eliminate reflection of the light into the camera lens. The anti-reflective shield 726 is shown surrounding the clear portion 703 of the pool light lens 702, as described herein the anti-reflective shield is darkened to prevent light from the light source. In an example of an anti-reflective shield 726, the darkened portion may be a completely opaque material and may be used to obstruct all light from passing through the anti-reflective shield 726.

For example, the anti-reflective shield 726 may be an inserted ring or sleeve or a darkened area in the molding process to eliminate the reflective light, whenever the lights are on, through the pool light lens 702 into the camera lens. Without the anti-reflective shield 726, light may be reflected into the camera lens causing poor image quality, distorted images, or lack of images all together.

Figure 8A:
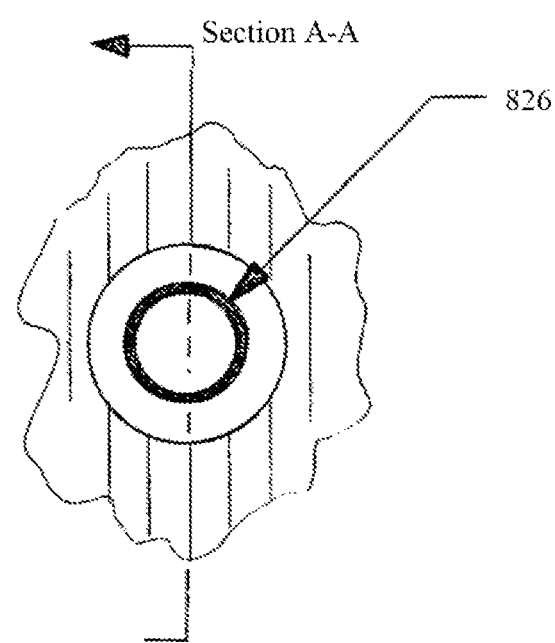
FIGS. 8A-8C illustrate the front view, sectional view A-A, and perspective cross section view of a pool light and camera assembly, respectively, according to an aspect.
Figure 8B:
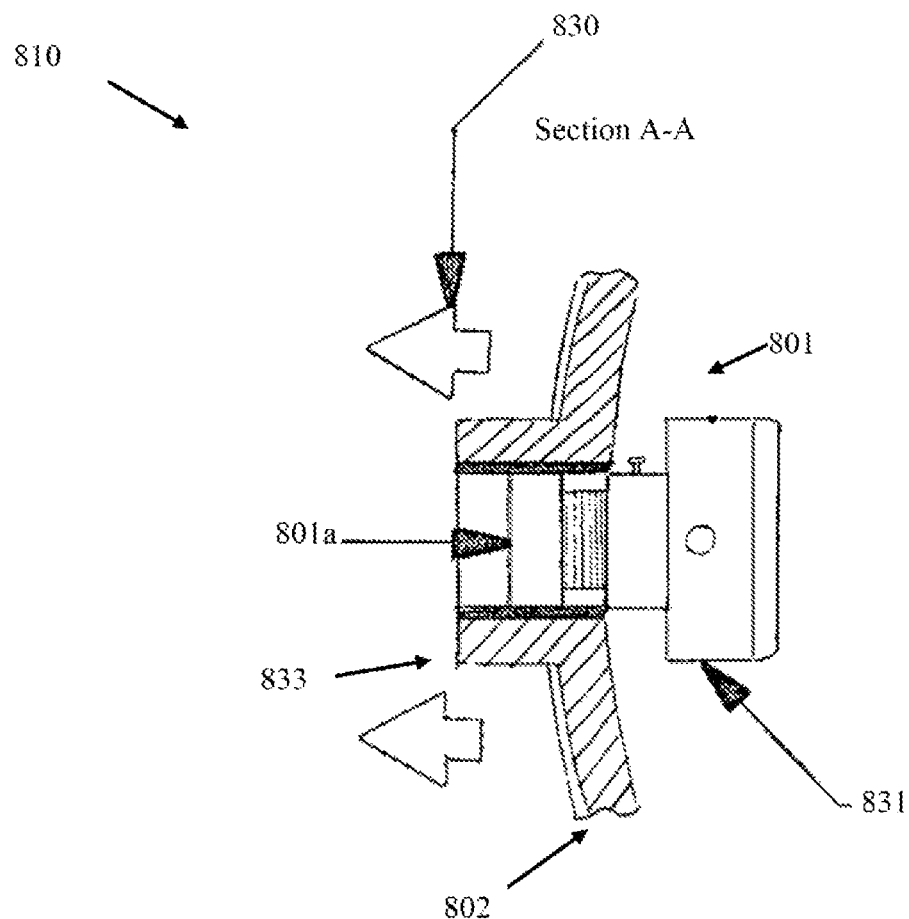
Figure 8C:
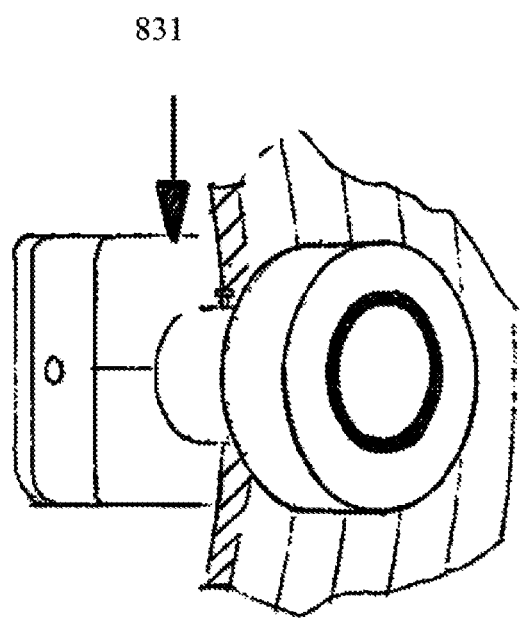

FIGS. 8A-8C illustrate the front view, sectional view A-A, and perspective cross section view of a pool light and camera assembly 810, respectively, according to an aspect. As shown, the protrusion 833 of the pool light lens 802 may have the video camera lens 801a fit into the extended area of the pool light lens protrusion 833.

The arrows 830 depict the pool light beams which pass through the pool light lens 802 into the pool water. The pool light lens 802 diffuses the light which causes reflection through the pool light lens 802 and may interfere with camera image quality. The anti-reflective shield 826 and the video camera lens 801a mounted flush against the pool light lens 802 prevent light reflecting into the camera lens 801a. In an example, the lens 802 may not be a single flat surface, the lens may have a protrusion 833, which may further eliminate reflection of the light into the camera lens 801a. The protrusion 833 protrudes past the pool light lens's 802 flat surface allowing the camera lens 801a to not be in the direct projection of the light beams, shown by the arrows 830.

Figure 9A:
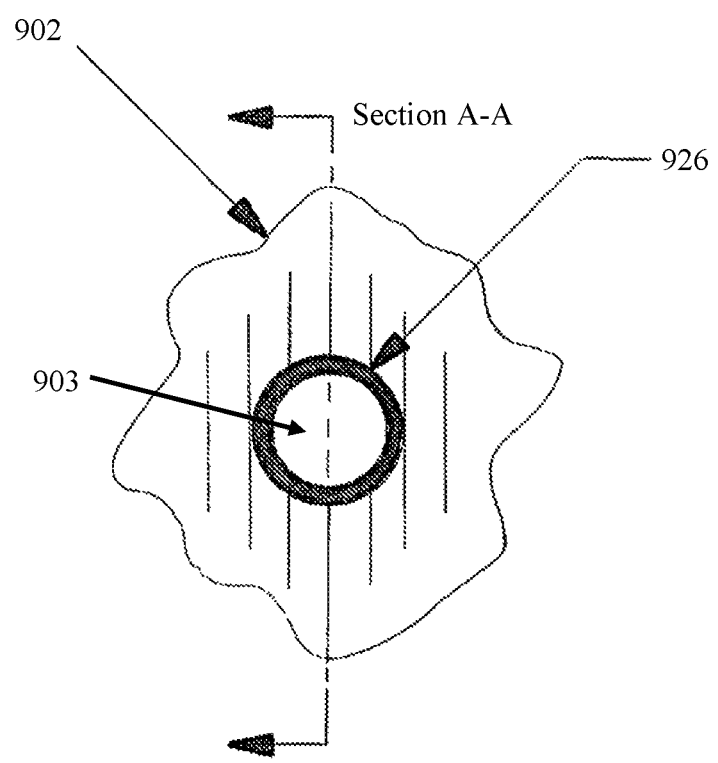
FIG. 9A and FIG. 9B illustrate the front view and sectional view A-A of a pool light and camera assembly, respectively, according to an aspect.
Figure 9B:
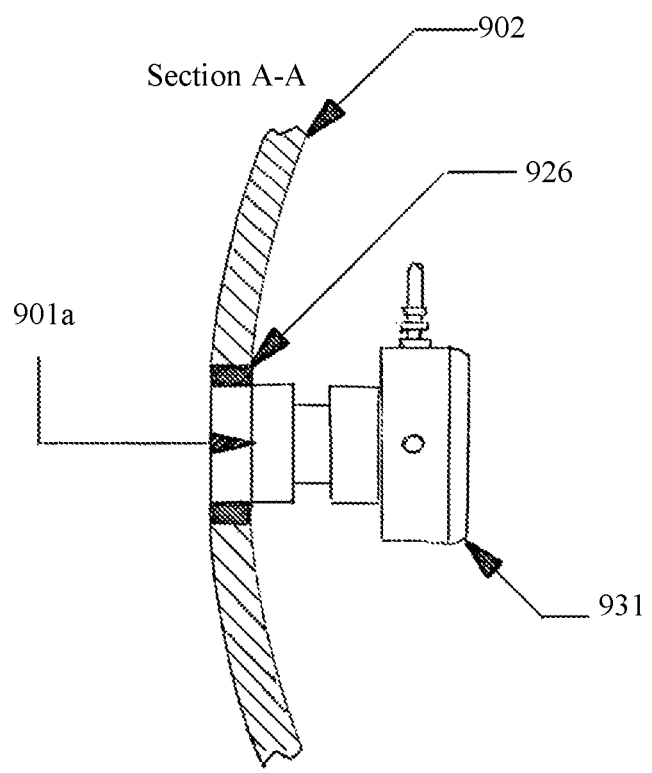

FIG. 9A and FIG. 9B illustrate the front view and sectional view A-A of a pool light and camera assembly, respectively, according to an aspect. The video camera body 931, as shown, may be mounted to allow the camera's lens 901a flush against the pool light lens 902. The anti-reflective shield 926 may be an inserted ring or sleeve or a darkened area in the molding process to eliminate the reflective light whenever the LED lights are on through the lens into the camera. As described herein, without the anti-reflective shield 926, light may be reflected into the camera lens 901a causing poor image quality, distorted images, or lack of images all together.

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

Claim limitations should be construed as means-plus-function limitations only if the claim recites the term "means" in association with a recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. An underwater light and camera system comprising:
a video camera having a camera lens;
a pool light having a light source and a pool light lens, wherein the pool light lens has a clear portion and a plurality of ribs disposed on an outer surface of the pool light lens, other than on the clear portion of the pool light lens;
an anti-reflective shield surrounding the clear portion of the pool light lens, wherein the anti-reflective shield is darkened to prevent light from the light source and a portion of the pool light lens disposed outside the anti-reflective shield to directly reach the camera lens;
a niche covered by the pool light lens and both the light source and the video camera are housed within the niche, wherein the camera lens is flush with the pool light lens;
a pool light junction box, having a junction box cover and a junction box base, and is adapted to connect to a power supply with a connection wire to the video camera;
a transmitter box adapted to receive a video signal from the video camera and convert the video signal to a wireless transmission; and
a home transceiver adapted to receive the wireless transmission of the video signal.

2. The underwater light and camera system of claim 1, wherein the transmitter box is wireless.

3. The underwater light and camera system of claim 1, wherein pool light junction box has a switch to turn on and off power of the underwater light and camera system.

4. The underwater light and camera system of claim 1, wherein the transmitter box has an exterior antenna.

5. The underwater light and camera system of claim 1, wherein the connection wire through the pool light junction box has connectors, which have a weatherproof seal.

6. An underwater light and camera system comprising:
a video camera having a camera lens;
a pool light having a light source and a pool light lens, wherein the pool light lens has a clear portion and a plurality of ribs disposed on an outer surface of the pool light lens, other than on the clear portion of the pool light lens; and
an anti-reflective shield surrounding the clear portion of the pool light lens, wherein the anti-reflective shield is darkened to prevent light from the light source and a portion of the pool light lens disposed outside the anti-reflective shield to directly reach the camera lens.

7. The underwater light and camera system of claim 6, further comprising:
a niche having the pool light lens as a covering and both the light source and the video camera are housed within the niche;
a pool light junction box having a junction box cover and a junction box base, and is adapted to connect to a power supply with a connection wire to the video camera;
a transmitter box adapted to receive a video signal from the video camera and convert the video signal to a wireless transmission, wherein the transmitter box is housed within the pool light junction box; and
a home transceiver adapted to receive the wireless transmission of the video signal.

8. The underwater light and camera system of claim 7, wherein the transmitter box is remotely connected to the video camera.

9. The underwater light and camera system of claim 7, wherein the home transceiver is a computer device.

10. The underwater light and camera system of claim 7, having a power switch set on a timer.

11. The underwater light and camera system of claim 6, wherein the anti-reflective shield is an inserted ring on the pool light lens.

12. The underwater light and camera system of claim 6, further comprising a protrusion on the outer surface of the pool light lens, wherein an inner surface of the protrusion on the pool light lens and the camera lens are coupled.

13. The underwater light and camera system of claim 6, wherein the clear portion of the pool light lens is in the center of the pool light lens.

14. A method of utilizing an underwater light and camera system comprising the steps of:
receiving a pool light and camera assembly having a video camera with a camera lens and a pool light with a light source and a pool light lens, wherein the pool light lens has a clear portion and a plurality of ribs disposed on an outer surface of the pool light lens, other than on the clear portion of the pool light lens;
inserting the pool light and camera assembly into a niche;
connecting the pool light and camera assembly to a pool light junction box having a weatherproof junction box cover and junction box base, and a weatherproof connector, wherein the pool light junction box is connected to a power supply;
covering the niche with the pool light lens having an anti-reflective shield, the anti-reflective shield surrounding the clear portion of the pool light lens, wherein the anti-reflective shield is darkened to prevent light from the light source and a portion of the pool light lens disposed outside the anti-reflective shield to directly reach the camera lens, wherein the camera lens and the pool light lens are flush;

activating the underwater light and camera system by turning the power on; and capturing footage of an underwater scene.

15. The method of utilizing an underwater light and camera system of claim 14, wherein the video camera captures footage by detecting motion via a motion detector.

16. The method of utilizing an underwater light and camera system of claim 14, wherein pool light and camera assembly is implemented by retrofitting the niche.

17. The method of utilizing an underwater light and camera system of claim 14, wherein activating the underwater light and camera system the is done by initiating a startup sequence using the user's network credentials.

* * * * *